United States Patent
Pizzorno et al.

(10) Patent No.: US 7,373,057 B2
(45) Date of Patent: May 13, 2008

(54) TELECOMMUNICATION LOOSE TUBE OPTICAL CABLE WITH REDUCED DIAMETER

(75) Inventors: Massimo Pizzorno, Milan (IT); Alessandro Ginocchio, Milan (IT); Enrico Consonni, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/573,894

(22) PCT Filed: Sep. 30, 2003

(86) PCT No.: PCT/EP03/10913

§ 371 (c)(1),
(2), (4) Date: May 8, 2007

(87) PCT Pub. No.: WO2005/040882

PCT Pub. Date: May 6, 2005

(65) Prior Publication Data

US 2007/0274647 A1    Nov. 29, 2007

(51) Int. Cl.
*G02B 6/44* (2006.01)

(52) U.S. Cl. .................. 385/109; 385/103; 385/113; 385/128

(58) Field of Classification Search .................. None
See application file for complete search history.

(56) References Cited

U.S. PATENT DOCUMENTS

| 5,104,433 | A   |   | 4/1992 | Chapin et al. |
| 6,424,770 | B1  |   | 7/2002 | Nothofer |
| 6,681,071 | B2  | * | 1/2004 | Newton et al. ............. 385/113 |
| 2005/0207715 | A1 | * | 9/2005 | Roba et al. ................. 385/128 |

FOREIGN PATENT DOCUMENTS

| EP | 0 311 186 | 4/1989 |
| WO | WO-03/091781 A1 | 11/2003 |

OTHER PUBLICATIONS

International Electrotechnical Commission, IEC; "Generic Specification-Basic Optical Cable Test Procedure", IEC 60794-1-2 Standard, pp. 1-102, (2002).

Bellcore; "Generic Requirements for Optical Fiber and Optical Fiber Cable"; Generic Requirements, GR-20-CORE, Issue 2, ppi-xii, preface 1-4, 1-1-6-32, Appendix 1, 2, References 1-4, Glossary 1-4, ROL-1-22, ROI 1-2, and Index 1-4, (1998).

(Continued)

*Primary Examiner*—Tina M. Wong
(74) *Attorney, Agent, or Firm*—Finnegan, Henderson, Farabow, Garrett & Dunner, L.L.P.

(57) ABSTRACT

An optical fiber cable has a highly reduced diameter. The cable has a central strength member; a number of tubes containing loosely arranged optical fibers, each tube having a thickness, and each optical fiber having a coating; and a protective outer jacket, wherein the filling coefficient of optical fibers in at least one loose tube is $\geq 45\%$. The tubes are made of a material having an elasticity modulus $\geq 700$ MPa; and the optical fibers are SM-R fibers having a microbending sensitivity $\leq 4.0$ dB·km$^{-1}$/g·mm$^{-1}$ at a temperature of about $-30°$ C. to $+60°$ C. at about 1550 nm.

17 Claims, 1 Drawing Sheet

OTHER PUBLICATIONS

Fitel USA Corp.; Maximizing the Capacity and Cost-Effectiveness of Metropolitan Fiber Access; MiDia® FX *Plus* Cable; 2 pages, (2003).

Solitis et al.; "Next Generation Loose Tube Cables: Reduce the Size, Not the Performance"; Proceedings of the 49th International Wire & Cable Symposium, pp. 155-163, (2000).

Solitis et al.; "Next Generation Loose Tube Cables: Reduce the Size, Not the Performance"; Proceedings of the 49th International Wire & Cable Symposium, pp. 155-163.

Gaillard et al.; "Optimization of Loose Tube Cable Designs: The Next Step"; International Wire & Cable Symposium Proceedings, pp. 913-920, (1998).

Grasso et al.; "Microbending Effects in Single Mode Optical Cables"; International Wire & Cable Symposium Proceedings, pp. 722-731, (1988).

"MiDia FX Cable"; OFS Disclosure, http://65.82.128.141/product_info/documents/MiDiaFXpluscableosp-131-0803web.pdf, pp. 1-2, (May 2003).

Gebizlioglu; "Time- and Temperature-Dependent Material Behavor and its Impact on Low-Temperature Performance of Fiber Optic Cables"; Mat. Res. Soc. Symp. Proc., vol. 531, pp. 333-345, (1998).

Waegli et al., "Fibre Optics '88", Baker, Editor, SPIE, vol. 949, pp. 44-50, (1988).

\* cited by examiner

TELECOMMUNICATION LOOSE TUBE OPTICAL CABLE WITH REDUCED DIAMETER

CROSS REFERENCE TO RELATED APPLICATION

This application is a national phase application based on PCT/EP2003/010913, filed Sep. 30, 2003, the content of which is incorporated herein by reference.

BACKGROUND OF THE INVENTION

1. Field of the Invention

The present invention relates to telecommunication optical cables and in particular it relates to a telecommunication optical cable having a highly reduced diameter, which is particularly suitable for being installed in conduits by a "blown method".

2. Description of the Related Art

Access and trunk telecommunication networks made by copper wires are being replaced by optical fiber networks in view of their large bandwidth capabilities. As the replacement is submitted to the effective final client requests and is rather expensive for a telecommunication provider, some providers use to arrange a network made only of empty plastic conduits and to install the optical fiber cables in the conduits only when proper requests from the clients have been received. In metropolitan areas, where the available space is usually strict, reduced diameter cables with a medium or high optical potentiality (in terms of number of fibres) is requested for the main network links. A usual optical cable for main network links is generally requested to have a number of fibres not less than 48, typically 72.

A suitable technique to install these optical cables in the conduits is the "blown method": the optical fibre cable is propelled along the conduit by fluid drag of a gaseous medium, preferably air, blown along the conduit in the desired direction of cable advance. Blowing methods are deemed to be profitable for installing cables in long and short routes due to the lower cost, short time and low tension on the cable. Several features affect the blowing performances of a cable. Such features comprise: inner diameter of the duct, "tortuosity" of the installation path, and cable characteristics (including dimensions, mechanical stiffness and cable weight).

The cable structures mainly employed for blown installation in conduits to form main network links are the Multi Loose Tube (MLT), the Ribbon in Slotted Core (RISC) and the Central Loose Tube (CLT). In turn, CLT cables can be of the "fiber bundle" type or of the "micromodule" type.

A typical MLT cable comprises: a central strength member having a compressive stiffness that is effective to inhibit substantial contraction of the cable and a tensile stiffness that partially or totally contributes to withstand tensile loads without substantially transfer of the tensile loads to the cabled optical fibers; a number of tubes arranged around the central strength member and containing loosely placed optical fibers; a mechanical reinforcing layer, for example a thread made of glass or of an aramid material arranged around the tubes, if necessary for tensile load cable withstanding; and a protective outer jacket. The tubes containing the optical fibers are typically stranded around the central strength member according to an unidirectional helix or a bidirectional (SZ) helix.

A typical RISC cable includes a cylindrical thermoplastic core extruded around a central strength member and having a plurality of helical slots in its exterior surface. Each slot houses a stack of optical fiber ribbons each having a planar array of optical fibers therein. The slotted core is surrounded by mechanical reinforcing layers and outer sheath as described for MLT cables.

A typical CLT cable comprises: a core tube containing optical fibers, a plastic jacket that surrounds the core tube, and a pair of linearly extending, diametrically opposed dielectric strength rods that are at least partially embedded in the jacket. The strength rods have the same function as the above described strength member of the MLT cable.

Most of the existing terrestrial cables having a medium or high potentiality in terms of number of fibres are not optimized for being blown installed into miniaturized tubes and do not allow to exploit the whole technical and economical advantages of the blown cable installation method.

Thus, the Applicant has perceived a need to provide lightweight and highly reduced-diameter optical cables for being profitably installed in rather small diameter ducts by a blown installation method.

The Applicant has focused on MLT cables with the main object to reduce the diameter thereof.

M. G. Soltis, et al., "Next Generation Loose Tube Cables: Reduce The Size, Not The Performance", Proceedings of the $49^{th}$ International Wire & Cable Symposium, pp. 155-163, discusses various design considerations and different steps of development that lead to a reduced size loose tube cable family with performance comparable to larger designs. As far as the tubes containing the fibers are concerned, only problems relating to EFL (excess fiber length) and size have been addressed. Finally, an optical cable having the following characteristics has been presented: number of optical-fibers: 72; number of tubes: 6; fibers per tube: 12; cable diameter: 10.7 mm; and fiber density 0.81 fiber/mm$^2$. According to the Applicant, a similar cable is inadequate for installation through blowing techniques in miniaturized tube infrastructures suitable for metropolitan areas.

P. Gaillard, et al., "Optimization Of Loose Tube Cable Designs: The Next Step", International Wire & Cable Symposium Proceedings 1998, pp. 106-111, discloses how to reduce cable size and cable installation costs both for MLT and CLT cables. The optimized cable designs, according to this paper, are:

MLT cable: number of fibers: 60; cable diameter: 8.2 mm.
CLT cable: number of fibers: 72; cable diameter: 7.92 mm.

The nominal cable diameters lead to a cabled fiber density of approximately 1.15 to 1.47 fiber/mm$^2$. In the cable according to P. Gaillard, et al., the tube outer diameter is similar to existing sizes whilst the cable sheath has been reduced as much as possible. Thus, P. Gaillard et al. does not describe nor suggest to increase the fiber density in the loose tubes.

In the attempt of reducing the dimensions of MLT cables, the Applicant has considered the possibility of reducing the diameter of the loose tubes.

The Applicant has carried out some tests and has observed that MLT cables, when the loose tube diameter is reduced, are subject to a number of problems including the following two. First, by reducing the loose tube diameter, the space for the optical fibers is correspondingly, reduced. In other words, the fiber-to-fiber distance becomes lower and the fiber-to-tube distance becomes lower as well. Second, using loose tubes having a reduced diameter with respect to the standard tubes results in reduced Stress Free Window (SFW) safety margins. In this concerns, it should be taken into account that typically the process of tubing the fibers allows to obtain a nominal EFL value with a minimum tolerance of ±0.05% and that this EFL tollerance is considered critical (too large) by the Applicant in order to realize highly miniaturized MLT cables with stable and regular transmission performances.

The Applicant has realized that the reduction of loose tube size results in microbending problems, in turn resulting in higher attenuations of the transmitted signals. The Applicant has conducted several tests and has concluded that a highly miniaturized MLT optical cable can be obtained by reducing the central rod diameter, the outer diameter of loose tubes together with their thickness, and both diameter and thickness of the outer jacket. Whilst such reductions of whole cable diameter and loose tube diameters result in higher fiber densities, the Applicant has realized that the negative effects caused by the increased fiber density within the loose tubes can be eliminated, or at least attenuated, by providing optical fibers having a microbending sensitivity $\leq 4.0$ dB·km$^{-1}$/g·mm$^{-1}$ in a temperature range from about $-30°$ C. to $+60°$ C. at 1550 nm and tubes comprising a material having an elasticity, modulus $\geq 700$ MPa.

SUMMARY OF THE INVENTION

According to a first aspect, the present invention provides an optical fiber cable comprising: a central strength member; a number of tubes containing optical fibers; and a protective outer jacket; wherein the filling, coefficient of optical fibers in at least one loose tube is $\geq 45\%$; the tubes comprise a material having an elasticity modulus $\geq 700$ MPa; and the optical fibers have a microbending sensitivity 4.0 dB·km$^{-1}$/g·mm$^{-1}$ in a temperature range from about $-30°$ C. to $+60°$ C. at about 1550 nm.

Preferably, the optical fibers are loosely-arranged or semi-loosely arranged.

Typically, the optical fibers are single mode, SM, or single mode reduced, SM-R, fibers.

More preferably, the tubes comprise a material having an elasticity modulus $\geq 800$ MPa, still more preferably, $\geq 1000$ MPa.

Preferably, the optical fibers comprise an inner coating layer of a material having an elastic modulus lower than about 200 MPa when measured at $-30°$ C. and lower than about 2 MPa when measured at a temperature from about $+20°$ C. to $+60°$ C.

More preferably, the optical fibers comprise an inner coating layer of a material having an elastic modulus lower than about 80 MPa when measured at about $-30°$ C., still more-preferably between about 20 and 60 MPa.

Preferably, the optical fibers comprise a mass colored outer coating layer.

Preferably, the filling coefficient of optical fibers in at least one loose tube is $\geq 50\%$.

Preferably, the tubes are made of a material selected from the group consisting of: polybutylenthereftalate, high density polythene, medium density polythene and low density polytene.

Preferably, the tubes have an inner diameter $\leq$ about 1.25 mm, more preferably $\leq$ about 1.20 mm.

Preferably, the outer diameter of colored optical fibers is about 0.245 mm.

Preferably, the external cable-diameter is $\leq$ about 7.0 mm, more preferably $\leq$ about 6.0 mm with a number of optical fibers $\geq 72$.

Preferably, the outer jacket is made of a material selected from the group consisting of: Polyamide 12, high density polythene, medium density polythene and low density polytene, still more preferably it is made of a graphite-charged Polyamide 12 compound.

BRIEF DESCRIPTION OF THE DRAWINGS

The present invention will become fully clear after reading the following detailed description and having reference to the attached drawings, wherein.

DETAILED DESCRIPTION OF THE INVENTION

Figure 1:
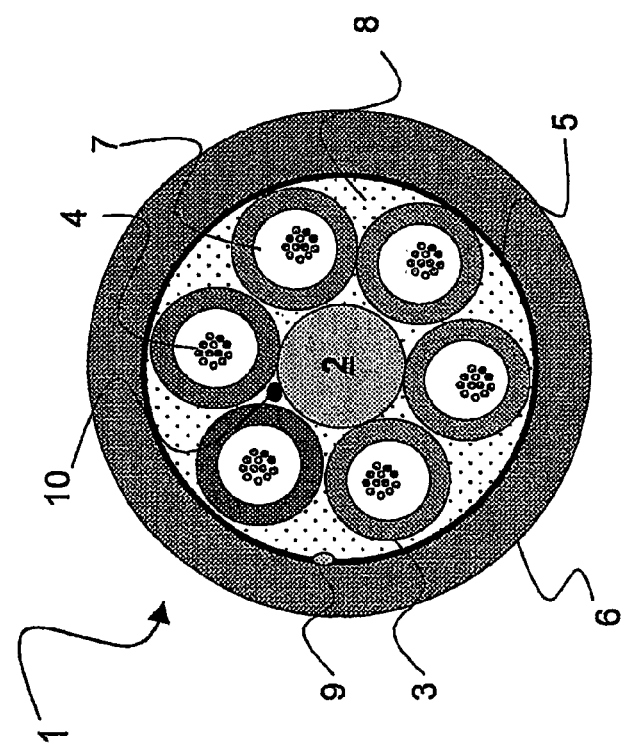
FIG. 1 shows a cross section of an optical cable according to the present invention.

With reference to FIG. 1, a multi loose tube (MLT) cable 1 comprises: a central strength member 2; a number of tubes 3 arranged around the central strength member 2 and housing loosely placed optical fibers 4; a mechanical reinforcing layer 5 (if necessary for cable tensile load withstanding), for example a thread made of glass or of an aramid material, arranged around the tubes; and a protective outer jacket 6 surrounding the reinforcing layer.

The tubes 3 containing the optical fibers 4 are typically stranded around the central rod 2 according to an unidirectional helix or a bidirectional (SZ) helix. The stranded tubes 3 and the central rod enclosed therebetween define a so called "stranded tube core". Preferably, the tubes 3 are filled of jelly 7 or the like. Alternatively, the tube 3 may be filled with igro-expanding agents, such as powders or filaments. Similarly, the interstices between central rod 2, tubes 3 and outer jacket 6 are filled of igro-expanding agents 8, such as powders or filaments, and at least one igro-expanding thread 10 may be arranged around the central rod 2 or around the bundle of tubes 3. Finally, preferably, one or two rip cords 9 are provided.

As it will become clear, the cable 1 according to the present invention, in view of its extreme reduced size, can be defined as a "semi-loose tube" cable instead of "loose tube" cable.

The Applicant has carried out a number of tests, starting from a comparative MLT optical cable of a known type that is described in the following Table 1, with the object to reduce the size as much as possible and to render the cable suitable for blown installation. This cable will be identified as "first comparative cable". The first comparative cable includes 72 fibers evenly distributed in six tubes 3.

TABLE 1

| First Comparative Cable Structure | |
|---|---|
| Diameter of central rod [mm] | 2.6 |
| Outer/Inner diameter of loose tubes [mm/mm] | 2.50/1.80 |
| Outer diameter of ink colored optical fiber [mm] | 0.255 |
| Diameter of twelve-fiber bundle [mm] | 1.034 |
| Stranding Pitch of tubes 3 [mm] | 90 |
| Outer diameter of stranded tube core [mm] | 7.60 |
| Jacket thickness [mm] | 1.5 |
| Jacket material | LDPE |
| Outer diameter of cable [mm] | 10.7 |
| SFW$_{tot}$ [%] | 0.95 |
| Operating temperature range of the cable [° C.] | −40 to +70 |
| Maximum attenuation variation $\Delta\alpha_{max} \leq 0.05$ dB/Km at 1550 nm | |

TABLE 1-continued

First Comparative Cable Structure

| | |
|---|---|
| Bending radius of cabled fibers - straight cable [mm] | 65 (min.) |
| | 83 (aver.) |
| | 117 (max) |
| Index of resistance to crash force of tubes 3 [(thickness/mean radius)$^3$] | ~3.4 · 10$^{-2}$ |
| Radial gap between loose tube 3 and fiber bundle | |
| Difference between diameters [mm] | 0.776 |
| Ratio between diameters | 1.74 |
| Filling coefficient of optical fibers in loose tube [%] | 24.1 |
| Fiber density within a loose tube [fibers/mm$^2$] | 4.71 |
| Fiber density within a cable [fibers/mm$^2$] | 0.80 |

SFW, Stress Free Window (SFW$_{tot}$=SFW$_{tensile}$+SFW$_{compression}$), represents the maximum amount of longitudinal length variation of the cable axis (due to both thermal contraction/expansion and mechanical extension) that does not submit the cabled fibres to stress conditions (tension in case of cable elongation, buckling in case of cable contraction). The total SFW is function of cable geometry; the repartition of total SFW in SFW$_{tensile}$ and SFW$_{compression}$ is a function of EFL (Excess Fiber Length). Within the maximum value of such a longitudinal length variation (SFW), the cabled optical fibers are not congruent to the cable structure: maintaining their helix configuration, the fibres are free to move, mainly in a radial direction. The movement of fibers will be towards the cable neutral axis in case of cable elongation and towards the opposite direction in case of cable compression.

For the purposes of the present invention, the "filling coefficient of a loose tube" is the ratio of the total area of all the optical fibers forming the fiber bundle versus the inner area of a loose tube cross-section. In turn, the total area of all the optical fibers forming a fiber bundle is the area of a single optical fiber multiplied by the number of fibers in the bundle.

For the purposes of the present invention, the "fiber density within a loose tube" is the ratio of the number of fibers in a bundle versus the inner area of a loose tube cross-section.

Finally, for the purposes of the present invention, the "fiber density within a cable" is the ratio of the number of cabled optical fibers versus the cable cross-section area.

Figure 2:
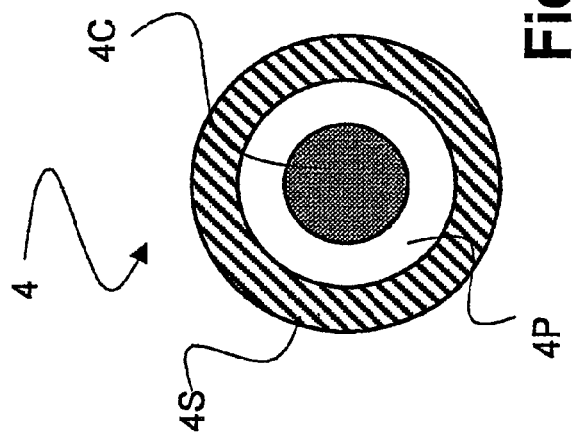
FIG. 2 shows an enlarged cross section of ah optical fiber used in the cable of FIG. 1.

The first comparative cable was provided with typical optical fibers, identified as "type A" optical fibers (or simply "A" fibers) in the remaining part of this description. With reference to FIG. 2, fiber "A" comprises a central glass portion 4C defined by a glass core and a glass cladding, an inner soft coating layer 4B surrounding the glass portion 4C and and outer harder coating layer 4S providing resistance against radial forces. The fiber 4 also comprises an ink layer 4I over the outer layer 4S.

Fibers "A" comprise a glass core of a diameter of about 0.125 mm, a primary coating layer having a diameter of about 0.190 mm and a secondary coating layer having a diameter of about 0.245 mm. The fiber "A" used in the first comparative cable was colored with ink in order to be identified in the cable according to a specific color code system: the diameter of the ink colored fibre is about 0.255 mm. The following Table 2 reports the elastic module of inner and outer coating layers of fiber "A" at different temperatures.

TABLE 2

Elastic modulus [MPa] as a function of temperature (measured at DMTA - Differential Mechanical Thermal Analysis - at a frequency of 1 rad/sec)

| Fiber "A" | T = −30° C. | T = 0° C. | T = +22° C. | T = +60° C. |
|---|---|---|---|---|
| Inner coating layer | 300 | — | 1.8 | 1.9 |
| Outer coating layer | (~1600)** | 1600 | 1000 | — |

**Elastic modulus of outer layer coating was not measured at −30° C., because the elastic modulus of acrilates typically reaches a "plateau" value at about 0° C. and such a value does not sensibly change significantly at lower temperatures.

While the above described first comparative optical cable has shown a very strong structure and a large operating temperature range, it is not suitable for being installed by blown methods within miniaturized tubes because of its large diameter.

For the purposes of the present invention, with "operating temperature" it is intended the temperature range wherein the cable, after being submitted to a thermal cycling test carried out according to IEC 60794-1-2 standard "Generic Specification-Basic Optical Cable Test Procedure" and to an aging test carried out according to Bellcore GR-20-CORE" Generic Requirements For Optical Fiber And Optical Fiber Cable", shows a maximum attenuation variation Δα$_{max}$≦0.05 dB/Km at 1550 nm.

The Applicant has therefore considered a reduced size optical cable (briefly, "second comparative cable") whose characteristics are listed in the following table 3. The second comparative cable was equipped, as the first comparative cable, with 72 fibers "A" evenly distributed among six tubes 3.

TABLE 3

Second Comparative Cable Structure

| | |
|---|---|
| Diameter of central rod [mm] | 2.0 |
| Outer/Inner diameter of loose tubes [mm/mm] | 1.90/1.35 |
| Outer diameter of ink colored optical fiber [mm] | 0.255 |
| Diameter of twelve-fiber bundle [mm] | 1.034 |
| Stranding Pitch of tubes 3 [mm] | 65 |
| Outer diameter of stranded tube core [mm] | 5.80 |
| Jacket thickness [mm] | 1.0 |
| Jacket material | HDPE |
| Outer diameter of cable [mm] | 7.9 |
| SFW$_{tot}$ [%] | 0.57 |
| Operating temperature range of the cable [° C.] | −10 to +50 |
| Maximum attenuation variation Δα$_{max}$ ≦ 0.05 dB/Km at 1550 nm | |
| Bending radius of cabled fibers - straight cable [mm] | 45 (min.) |
| | 57 (aver.) |
| | 78 (max) |
| Index of tube resistance to crash force of tubes 3 [(thickness/mean radius)$^3$] | ~3.9 · 10$^{-2}$ |
| Radial gap between loose tube 3 and fiber bundle | |
| Difference between diameters [mm] | 0.316 |
| Ratio between diameters | 1.31 |
| Filling coefficient of optical fibers in respect. loose tube [%] | 42.8 |
| Fiber density within a loose tube [fibers/mm$^2$] | 8.38 |
| Fiber density within a cable [fibers/mm$^2$] | 1.47 |

The reduced size (second comparative) optical cable has been obtained by reducing: the central rod diameter, the loose tube diameter and thickness, and the jacket thickness.

Through such reductions, the whole cable diameter has been reduced of about 35% (from 10.7 mm to 7.9 mm). The jacket of the reduced size cable has been made of HDPE for better friction performances with the installation conduit.

The fiber density within both the loose tubes and the whole cable results in lower design safety margins with respect to the first comparative cable: the obtained dielectric cable does not show acceptable attenuation in the whole temperature range from −40° C. to +70° C. Thus, a progressive reduction of the cable diameter has resulted in a corresponding reduction of transmission performances and in a corresponding operating temperature restriction.

The above inconveniences and limitations have been confirmed by further tests carried out by the Applicant through a highly reduced diameter optical cable (briefly, "third comparative cable") whose characteristics are listed in the following table 4.

TABLE 4

Third Comparative Cable Structure

| | |
|---|---|
| Diameter of central rod [mm] | 1.7 |
| Outer/Inner diameter of loose tubes [mm/mm] | 1.60/1.20 |
| Outer diameter of ink colored optical fiber [mm] | 0.255 |
| Diameter of twelve-fiber bundle [mm] | 1.034 |
| Stranding Pitch of tubes 3 [mm] | 60 |
| Outer diameter of stranded tube core [mm] | 4.90 |
| Jacket thickness [mm] | 0.50 |
| Jacket material | Polyamide 12 |
| Outer diameter of cable [mm] | 6.0 |
| $SFW_{tot}$ [%] | 0.30 |
| Operating temperature range of the cable [° C.] | 0 to +40 |
| Maximum attenuation variation $\Delta\alpha_{max} \leq 0.05$ dB/Km at 1550 nm | |
| Bending radius of cabled fibers - straight cable [mm] | 45 (min.) 57 (aver.) 78 (max) |
| Index of resistance to crash force of tubes 3 [(thickness/mean radius)$^3$] | ~2.3 · 10$^{-2}$ |
| Radial gap between loose tube 3 and fiber bundle | |
| Difference between diameters [mm] | 0.166 |
| Ratio between diameters | 1.16 |
| Filling coefficient of optical fibers in loose tube [%] | 54.2 |
| Fiber density within a loose tube [fibers/mm$^2$] | 10.61 |
| Fiber density within a cable [fibers/mm$^2$] | 2.55 |

Also the third comparative cable was equipped with fibers "A".

With respect to the second comparative cable, the third comparative cable (highly reduced size optical cable) has been obtained by further reducing: the central rod diameter, the loose tube diameter and thickness, and the jacket thickness. Through such reductions, the whole cable diameter has been reduced down to 6.0 mm, namely it has been reduced by about 45% (from 10.7 mm to 6.0 mm) with respect to the first comparative cable and by about 25% (from 7.9 mm to 6.0 mm) with respect to the second comparative cable. The jacket of the reduced size cable has been made of Polyamide 12 instead of LDPE or HDPE in order to further miniaturize the cable diameter using a very thin outer sheath having equivalent mechanical properties, with respect to the HDPE sheath of the second comparative cable.

For a similar highly reduced size optical cable, the Applicant has verified that the cable structure is no more able to provide, the full degree of freedom for avoiding mutual interferences of the fibers and forced contact of the fibers with the loose tube walls. Thus, longitudinal length changes in the cable result in attenuation increases, because of microbending effect due to contact pressure. The situation is also worst and becomes even more critic because it is no more possible to predict, during the cable design step, the $SFW_{tensile}$ and $SFW_{compression}$ safety margins taking into account the variability of the cable manufacturing process. In particular, reference should be made to the step of introducing the optical fibers within a tube and to the EFL (Extra Fibre Length) control. At best, the EFL values are spread in a ±0.05% range with respect to the nominal value and this spread is considered by the Applicant too large in order to assume the feasibility of miniaturized MLT cable with regular transmission properties. Briefly, a MLT cable having a highly reduced diameter but made in accordance with the prior-art knowledge is characterized by transmission versus temperature performances that are not suitable for outdoor telecommunication applications.

Figure 3:
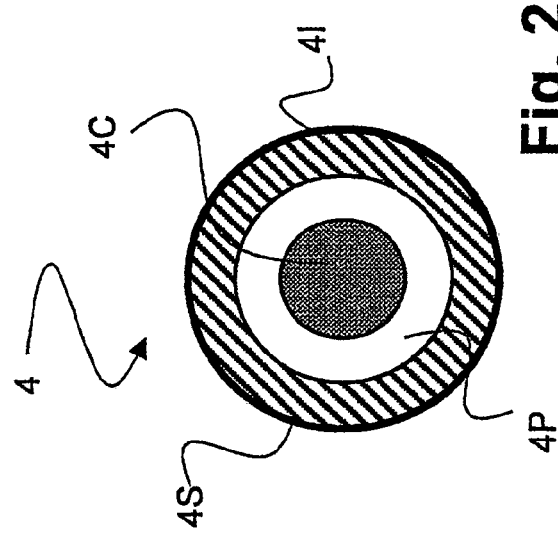
FIG. 3 shows an enlarged cross section of an optical fiber which can be more profitably used in the cable of FIG. 1.

The Applicant has observed that improved transmission characteristics can be obtained by employing optical fibers 4, as shown in FIG. 3, provided with at least two coating layers as the fiber of FIG. 2 but not comprising an ink layer and therefore having a reduced diameter. The outer coating layer 4S is mass colored to provide the required color distinction among the fibers. Advantageously, the elastic modulus of inner coating layer at low temperatures (about −30° C.) is lower than about 200 MPa, preferably lower than about 100 MPa, more preferably lower than about 80 MPa and still more preferably between about 30 and 60 MPa. This fiber will be hereinafter referred to as fiber "B". The elastic modulus as a function of temperature of the coating materials that could be profitably used in accordance with the present invention is reported in the following table 5.

TABLE 5

Elastic modulus [MPa] as a function of temperature (measured at DMTA - Differential Mechanical Thermal Analysis - at a frequency of 1 rad/sec)

| Fiber "B" | T = −30° C. | T = 0° C. | T = +22° C. | T = +60° C. |
|---|---|---|---|---|
| Inner coating layer | 54 | — | 1.6 | 1.6 |
| Outer coating layer | (~2200)** | 2200 | 1370 | — |

**Elastic modulus of outer layer coating was not measured at −30° C., because the elastic modulus of acrilates typically reaches a "plateau" value at about 0° C. and such a value does not sensibly change at lower temperatures.

It should be noticed that fiber "B", has an inner coating layer of a diameter of about 0.190 mm that is much softer than fiber "A" inner coating layer (especially at low temperatures) and an outer coating layer that is much harder than fiber "A" outer coating layer. In particular, the elastic modulus of the inner acrylic coating of fibers "B" is about six times lower than inner acrylic coating of fibers "A" at −30° C. Moreover, the fiber "B" is coated with an outer colored, coating layer and does not require to be ink colored before cabling: the effective fiber outer diameter is about 0.245 mm (with respect to the nominal outer diameter of 0.255 mm of the ink colored fiber "A"). In any case, the small reduction of fiber outer diameter is not considered significant by the Applicant in order to reach the final object of the present invention.

The Applicant has measured the microbending sensitivity of both fibers "A" and "B" through an EDM (Expandable Drum Method) test apparatus which will be described below. The results of such test have been reported in the following table 6.

TABLE 6

Expandable Drum Test Results

| | Microbending sensitivity at 1550 nm [dB/Km]/(g/mm)] | | |
|---|---|---|---|
| Type of fiber | T = −30° C. | T = +20 ° C. | T = +60° C. |
| "A" | 10 | 3 | 3 |
| "B" | 3 | 3 | 3.5 |

From the above table, it becomes apparent that fibers "A" and "B" mainly differ one from each other because of their behaviour at low temperatures. In particular, in the temperature range from +20° C. to +60° C., the microbending sensitivity of fiber "B" is almost equivalent to the one of fiber "A". On the contrary, the microbending sensitivity of fiber "B" at −30° C. is highly lower than the one of fiber "A" at the same temperature.

The Applicant has performed further tests by replacing generic optical fibers "A" by fibers "B" in the first, second and third comparative cables.

In a first test, the optical fibers "A" of the first comparative optical cable have been replaced by optical fibers of type "B". Whilst the first comparative optical cable with fibers "A" had already shown good performances in a wide temperature range (from −40° C. to +70° C.), the Applicant has observed that the employment of fibers "B" results in better and more stable performances well exceeding the requirements for the usual operation.

In a second test, the optical fibers "A" of the second comparative optical cable have been replaced by optical fibers of type "B". The Applicant has observed that the use of fibers of type "B" results in a cable having stable performances in a wider temperature range, namely from −30° C. to +60° C.

Finally, in a third test, the optical fibers "A" of the third comparative optical cable have been replaced by optical fibers of type "B". The Applicant has observed that the use of fibers of type "B" results in a cable having, stable performances in a wider and fully acceptable temperature range, namely from −20° C. to +60° C. This range makes the use of this cable structure practicable for most metropolitan applications.

The structure characteristics of a preferred embodiment of optical cable according to the present invention are listed in the following table 7.

TABLE 7

Structure of a Cable Embodiment According to the Invention

| | |
|---|---|
| Diameter of central rod [mm] | 1.7 |
| Outer/Inner diameter of loose tubes [mm/mm] | 1.60/1.20 |
| Outer diameter of ink colored optical fiber [mm] | 0.245 |
| Diameter of twelve-fiber bundle [mm] | 0.993 |
| Stranding Pitch of tubes 3 [mm] | 60 |
| Outer diameter of stranded tube core [mm] | 4.90 |
| Jacket thickness [mm] | 0.50 |
| Jacket material | Polyamide 12 |
| Outer diameter of cable [mm] | 6.0 |
| SFW$_{tot}$ [%] | 0.37 |
| Operating temperature range of the cable [° C.] | −20 to +60 |
| Maximum attenuation variation $\Delta\alpha_{max} \leq 0.05$ dB/Km at 1550 nm | |
| Bending radius of cabled fibers - straight cable [mm] | 45 (min.) |
| | 57 (aver.) |
| | 78 (max) |

TABLE 7-continued

Structure of a Cable Embodiment According to the Invention

| | |
|---|---|
| Index of resistance to crash force of tubes 3 [(thickness/mean radius)$^3$] | ~2.3 · 10$^{-2}$ |
| Radial gap between loose tube 3 and fiber bundle | |
| Difference between diameters [mm] | 0.207 |
| Ratio between diameters | 1.21 |
| Filling coefficient of optical fibers in loose tube [%] | 50.0 |
| Fiber density within a loose tube [fibers/mm$^2$] | 5.97 |
| Fiber density within a cable [fibers/mm$^2$] | 2.55 |

The Applicant has also verified that more consistent and regular results in terms of transmission performances are obtained when optical fibers of type "B", with a lower MAC, are used. The MAC is referred to as the mode field diameter MFD divided by a cutoff wavelength for a single mode fiber. According to the Applicant, the MAC should be $\leq 8.5$, preferably $\leq 8.0$ and more preferably $\leq 7.8$ at 1310 nm, with the corresponding value at 1550 nm being about 8.59.

As far as the third cable is concerned, it preferably comprises, an igro-expanding thread, long-pitch wound around the central rod. Six loose tubes 3 are SZ-stranded around the central rod, with an average stranding pitch of about 60 mm (for instance, 8 "Z" turns and 8 "S" turns or 6 "Z" turns and 6 "S" turns). The loose tubes 3 are preferably bound by two polypropylene tapes having a thickness of about 0.05 mm and a width of about 2.5 mm applied in a double threaded helix fashion. Twelve SM-R optical fibers are loosely arranged within each tube. The fibers are mass-colored and have a diameter of 245±10 µm. During the step of introducing a fiber bundle within a tube, the fibers are SZ stranded in order to equalize the length thereof. Preferably, the outer jacket comprises graphite-charged Polyamide 12 compound. The compound is preferably manufactured by EMS Chemie SA and is marked under "Grilamid L20LF" brand. As an alternative, the outer jacket could be made of HDPE, MDPE or LDPE, possibly treated with a water graphite-based solution for better friction performances.

The Applicant has verified that also the material of the tubes loosingly housing the optical fibers has a high relevance for obtaining a good performance cable according to the present invention. Advantageously, such tubes should have an elasticity modulus E$\geq$700 MPa, preferably $\geq$800 MPa and still more preferably $\geq$1000 MPa in order to assure mechanical, protection to the fibers both from radial and longitudinal external forces.

According to one preferred embodiment, the tubes comprise PBT polybuthylenthereftalate) and the elasticity modulus is about 2000 MPa. According to a further embodiment, the tubes comprise HDPE (High-Density Polythene) or MDPE (Medium Density Polythene) compound, characterized by an elasticity modulus $\geq$about 700 MPa.

A length of 3000 m of the highly reduced size cable (third cable) provided with fibers "B" has been subjected to a temperature test, in a range between −20° C. to +60° C., and afterwards to a hot aging test (seven days at 85° C.). The hot aging test has been followed by a further temperature cycling test carried out at the same temperature range as before. The cable length has shown a stable and regular attenuation at 1550 nm. All the cabled fibers showed maximum attenuation increase $\Delta\alpha_{max}\leq 0.05$ dB/Km.

The same cable has been continuously blown at an average speed of 18 m/min (the maximum speed being 36 m/min) in a polythene conduit having an inner diameter of 8 mm (the outer diameter being 10 mm) for a length higher than 2000 m by employing installation equipment of Plumentaz SA. The installation was fully successful.

As said above in connection with Table 6, the Applicant has tested the, "A" and "B" fibers for microbending sensitivity by an Expandable Drum Method apparatus. Such an apparatus is described in G. Grasso et al., "Microbending effects in single mode optical cables", International Wire & Cable Symposium Proceedings 1988, pp. 722-731 that is, incorporated herewith as a reference. The microbending effects on optical fibers have been characterized by using an expandable bobbin. This 300 mm metallic bobbin was coated with a special rough material (3M Imperial® PSA—grade 40 µm). Its radial dimension can be varied by means of a motor driven-device. This device is connected with a personal computer which controls also an optical measuring system composed of an apparatus for spectral attenuation measurement and a test set-up for fiber strain measurement by phase shift technique. The test was performed by winding with zero tension a long length of fiber (about 500 m) on the bobbin and expanding it while monitoring fiber transmission loss versus wavelength and fiber strain. Linear pressure on the fiber is calculated from the measured fiber elongation $\theta$ being $p=(EA)\theta/R$, where (EA) is the fiber tensile stiffness and R the bobbin radius. From these measurements, microbending losses as a function of wavelength and linear pressure are obtained. During the drum expansion, the fiber sample was measured both for optical transmitting power changes at a certain wavelength, preferably 1550 nm, and geometric elongation. Finally, taking into account the geometric fiber elongation and fiber tensile stiffness, the microbending sensitivity versus lateral pressure is calculated. Such a sensitivity is given by the ratio attenuation variation ($\Delta\alpha dB/Km$) versus the corresponding contact pressure variation against the expanding surface ($\Delta p$ g/mm). The measurements have been performed at +20° C., −30° C. and +60° C. representing standard operating temperatures of optical cables. The results are reported in Table 6.

In view of the favourable results that have been obtained on fiber "B", the Applicant has derived that a cable according to the present invention should employ SM-R fibers having a microbending sensitivity equal to or lower than, 4.0 dB·km$^{-1}$/g·mm$^{-1}$ when measured by an expandable drum apparatus in the temperature range from −30° C. to +60° C.

As it is known that the sensitivity to microbending of SM-R optical fibers depends primary on the physical properties of coating and secondary on the MAC number: due to that, all microbending measurements have to be normalized at a reference MAC number in order to properly compare fiber performances with different coating systems. As previously stated, the MAC value is referred to as the mode field diameter MFD divided by a cutoff wavelength. The lower the MAC, the lower the microbending sensitivity. The reference MAC number here considered for SM-R fibers is 8.59 at 1550 nm.

There has thus been shown and described a novel, telecommunication optical cable which fulfils all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

The invention claimed is:

1. An optical fiber cable comprising:
   a central strength member;
   a number of loose tubes containing optical fibers; and
   a protective outer jacket
   the filling coefficient of optical fibers in at least one loose tube being $\geq 45\%$;
   the tubes comprising a material having an elasticity modulus $\geq 700$ MPa; and
   the optical fibers having a microbending sensitivity $\leq 4.0$ dB·km 1/g·mm$^{-1}$ at a temperature about −30° to +60° C. at about 1550 nm.

2. The optical fiber cable according to claim 1, wherein the optical fibers are single mode or single mode reduced fibers.

3. The optical fiber cable according to claim 1, wherein the loose tubes comprise a material having an elasticity modulus $\geq 800$ MPa.

4. The optical fiber cable according to claim 1, wherein the loose tubes comprise a material having an elasticity modulus $\geq 1000$ MPa.

5. The optical fiber cable according to claim 1 wherein the optical fibers comprise an inner coating layer of a material having an elastic modulus lower than about 200 MPa when measured at −30° C. and lower than about 2 MPa when measured at a temperature of about +20° C. to +60° C.

6. The optical fiber cable according to claim 5, wherein the optical fibers comprise an inner coating layer of a material having an elastic modulus lower than about 80 MPa when measured at about −30° C.

7. The optical fiber cable according to claim 5, wherein the optical fibers comprise an inner coating layer of a material having an elastic modulus of about 20 to 60 MPa when measured at about −30° C.

8. The optical fiber cable according to claim 1, wherein the optical fibers comprise a mass colored outer coating layer.

9. The optical fiber cable according to claim 1, wherein the filling coefficient of optical fibers in at least one loose tube is $\geq 50\%$.

10. The optical fiber cable according to claim 1, wherein the loose tubes are made of a material selected from polybutyleneterephthalate, high density polyethylene, medium density polyethylene and low density polyethylene.

11. The optical fiber cable according to claim 1, wherein the loose tubes have an inner diameter $\leq$ about 1.25 mm.

12. The optical fiber cable according to claim 1, wherein the loose tubes have an inner diameter $\leq$ about 1.20 mm.

13. The optical fiber cable according to claim 1, wherein the optical fibers are colored and have an outer diameter of about 0.245 mm.

14. The optical fiber cable according to claim 1, wherein the optical fiber cable has an external diameter of $\leq$ about 7.0 mm with a number of optical fibers $\geq 72$.

15. The optical fiber cable according to claim 1, wherein the optical fiber cable has an external diameter of $\leq$ about 6.0 mm with a number of optical fibers $\geq 72$.

16. The optical fiber cable according to claim 1 comprising an outer jacket made of a material selected from polyamide, high density polyethylene, medium density polyethylene and low density polyethylene.

17. The optical cable according to claim 16, wherein the outer jacket is made of a graphite-charged Polyamide 12 compound.

* * * * *